United States Patent Office 3,142,677
Patented July 28, 1964

3,142,677
SUBSTITUTED 1,2,4-DIOXAZINES
Arthur Ferguson McKay, Beaconsfield, Quebec, and Jean-Marc Billy, Montreal, Quebec, Canada, assignors to Monsanto Canada Limited, La Salle, Quebec, Canada
No Drawing. Filed Feb. 23, 1962, Ser. No. 175,281
8 Claims. (Cl. 260—244)

This invention relates to novel substituted 1,2,4-dioxazines and to the preparation of the same.

More particularly the invention relates to substituted 1,2,4-dioxazines comprising the fundamental structural formula

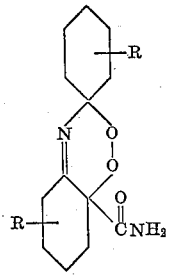

wherein R in both rings is hydrogen or lower alkyl.

The new products of this invention are useful in improving the yield strength in rubber and plastics and as a catalyst.

The substituted 1,2,4-dioxazines in this application are readily obtained by the reaction of a gas containing molecular oxygen with unsaturated β-amino-acid amides of the formula

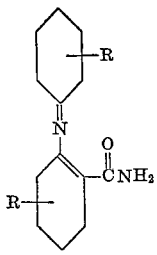

wherein R in both rings is hydrogen or lower alkyl. These amides may be produced by the reaction of a cyclohexanone or a cyclohexanone containing a lower alkyl substituent with urea in the presence of an inert aromatic hydrocarbon solvent such as xylene at reflux temperature. This process is disclosed in U.S. patent application Serial No. 159,585 by A. F. McKay, C. Podesva, and E. J. Tarlton filed December 15, 1961, now U.S. Patent No. 3,101,-373, and assigned to Monsanto Canada Limited.

In carrying out this invention the above described amide, stable in the solid state, is reacted with the oxygen containing gas in solution form, that is, dissolved in organic solvents such as ethanol, chloroform and the like. The reaction takes place in relatively short time with the final product separating out as a fine crystalline solid.

The gas containing molecular oxygen may be air, pure oxygen, oxygen enriched air, air containing relatively inert gaseous diluents, or the like. The reaction is normally carried out at room temperature and at atmospheric pressure. The process of this invention results in high yields of the product in very short time. With lower concentrates of oxygen, the yield is still high but the reaction requires longer periods for completion.

The following examples illustrate the present invention.

EXAMPLE I

Spiro [Cyclohexane-1',3-9-Carbamyl-3(H)-5,6,7,8-Tetrahydrobenzo-1,2,4-Dioxazine]

A solution of cyclohexylidene 2-carbamylcyclohex-1-enylamine (22.8 g.) in chloroform (750 ml.) was magnetically stirred in a two liter round bottom flask in an oxygen atmosphere. The reaction was at room temperature and atmospheric pressure and it was complete in 60 minutes. The suspension was then filtered at room temperature to give 22.7 g. (87%) of the pure compound M.P. 194° C. (dec.).

Analysis.—Percent calculated for $C_{13}H_{20}N_2O_3$: C, 61.89; H, 7.99; N, 11.11. Found C, 62.11; H, 7.86; N, 10.94.

EXAMPLE II

Spiro [4'Methylcyclohexane-1',3-7-Methyl-9-Carbamyl-3(H)-5,6,7,8-Tetrahydrobenzo-1,2,4-Dioxazine]

A solution of 4-methylcyclohexylidene 2-carbamyl 4-methylcyclohex-1-enylamine (5.0 g.) in chloroform (150 ml.) was reacted in a 250 ml. round bottom flask in an oxygen atmosphere. The reaction was at room temperature and atmospheric pressure and it was completed in 27 minutes. The suspension was then filtered to give 4.1 g. (73%) of the compound M.P. 191–192° C. (dec.).

Analysis.—Percent calculated for $C_{15}H_{24}N_2O_3$: C, 64.30; H, 8.63; N, 9.98. Found: C, 64.37; H, 8.73; N, 10.01.

EXAMPLE III

Spiro [4'-t-Butylcyclohexane-1',3-7-t-Butyl-9-Carbamyl-3(H)-5,6,7,8-Tetrahydrobenzo-1,2,4-Dioxazine]

A solution of 4-t-butylcyclohexylidene 2-carbamyl 4-t-butylcyclohex-1-enylamine (3.0 g.) in chloroform (125 ml.) was reacted in a 250 ml. round bottom flask in an oxygen atmosphere. The reaction was at room temperature and atmospheric pressure and it was completed in 30 minutes. The suspension was then filtered to give 3.2 g. (97%) of the compound M.P. 215–220° C. (dec.). Recrystallization from ethanol gave the pure material M.P. 218–220° C. (dec.).

Analysis.—Percent calculated for $C_{21}H_{36}N_2O_3$: C, 69.20; H, 9.95; N, 7.68. Found: C, 68.95; H, 9.76; N, 7.63.

The reaction in accordance with this invention can be enhanced by the presence of a catalyst such as cobalt or lead salts. To illustrate this, 16.5 g. of cyclohexylidene 2-carbamylcyclohex-1-enylamine were dissolved in 450 ml. of chloroform and the solution was divided into three equal parts. The equal parts were placed in a series of 250 ml. round bottom flasks, A, B and C. The solution in each flask was then treated as follows:

(A) With 92 mg. of a 6% by weight cobalt naphthenate solution, i.e. 0.1% by weight of cobalt.

(B) With 9.2 mg. of a 6% by weight cobalt naphthenate solution, i.e. 0.01% by weight of cobalt.

(C) With 92 mg. of a 6% by weight lead naphthenate solution, i.e. 0.1% by weight of lead.

This treatment was at 20° C. under atmospheric pressure with rapid magnetic stirring in an oxygen atmosphere.

These reactions were completed in flasks (A), (B), and (C) within 3, 12 and 15 minutes respectively. The reaction product, Spiro [cyclohexane-1',3-9-carbamyl-3(H)-5,6,7,8-tetrahydrobenzo-1,2,4-dioxazine] in each case was in excess of 90% by theory.

All of the various modes of carrying out the process described herein are within the scope of the present invention.

What is claimed is:

1. A compound having the formula

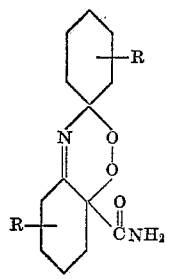

wherein R in both rings is a member of the group consisting of hydrogen and lower alkyl.

2. Spiro [cyclohexane-1',3-9-carbamyl - 3(H) - 5,6,7,8-tetrahydrobenzo-1,2,4-dioxazine].

3. Spiro [4' - methylcyclohexane - 1',3-7-methyl-9-carbamyl-3(H)-5,6,7,8-tetrahydrobenzo-1,2,4-dioxazine].

4. Spiro [4'-t-butylcyclohexane - 1',3-7-t-butyl - 9-carbamyl-3(H)-5,6,7,8-tetrahydrobenzo-1,2,4-dioxazine].

5. A process for the production of compounds having the formula

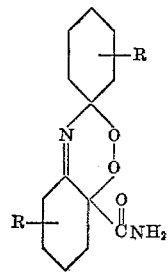

wherein R in both rings is a member of the group consisting of hydrogen and lower alkyl which comprises reacting a gas containing molecular oxygen with an amide in solution the amide having the formula

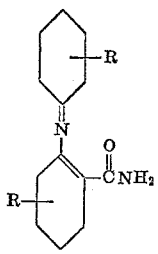

wherein R in both rings is a member of the group consisting of hydrogen and lower alkyl.

6. A process as described in claim 5 in which the reaction is carried out at room temperature and atmospheric pressure.

7. A process as described in claim 5 in which the reaction is carried out in the presence of a catalyst selected from the group consisting of cobalt and lead salts.

8. A process as described in claim 5 in which chloroform is used as the solvent for the amine.

No references cited.